US011516955B2

(12) United States Patent
Connors et al.

(10) Patent No.: US 11,516,955 B2
(45) Date of Patent: Dec. 6, 2022

(54) WHEEL ASSEMBLY OF AN AGRICULTURAL IMPLEMENT

(71) Applicant: CNH Industrial America LLC, New Holland, PA (US)

(72) Inventors: Michael J. Connors, Lockport, IL (US); Brian John Anderson, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 904 days.

(21) Appl. No.: 16/385,086

(22) Filed: Apr. 16, 2019

(65) Prior Publication Data

US 2020/0329623 A1  Oct. 22, 2020

(51) Int. Cl.
*A01B 63/22* (2006.01)
*B60G 17/005* (2006.01)
*A01B 63/00* (2006.01)

(52) U.S. Cl.
CPC ............ *A01B 63/22* (2013.01); *A01B 63/002* (2013.01); *B60G 17/005* (2013.01); *B60G 2202/413* (2013.01); *B60G 2204/143* (2013.01); *B60G 2204/4604* (2013.01); *B60G 2300/08* (2013.01); *B60G 2500/30* (2013.01)

(58) Field of Classification Search
CPC ..... A01B 63/22; A01B 63/002; A01B 73/005; A01B 39/24; A01B 73/00; B60G 17/005; B60G 2202/413; B60G 2204/143; B60G 2204/4604; B60G 2300/08; B60G 2500/30; B60G 2204/421

See application file for complete search history.

(56) References Cited

U.S. PATENT DOCUMENTS 3,169,027 A   2/1965 Oerman
3,633,679 A   1/1972 Dahlberg et al.
(Continued)

FOREIGN PATENT DOCUMENTS

EP   1008285   6/2000

OTHER PUBLICATIONS

Yieldtrac Planter Bar 36R20 Operator's Manual, Apr. 2016, Norwood Sales Inc., pp. 1 and 26-29, https://www.norwoodsales.com/files/manuals/yieldtrac/2016-36r20-36r22-yieldtrac_operators_manual.pdf.

(Continued)

*Primary Examiner* — Drew J Brown
*Assistant Examiner* — Timothy Wilhelm
(74) *Attorney, Agent, or Firm* — Rebecca Henkel; Rickard DeMille (57) ABSTRACT

A wheel assembly of an agricultural implement includes a wheel and a wheel frame supporting the wheel. The wheel frame is configured to pivotally couple to a toolbar of the agricultural implement, and the wheel frame is configured to rotate between a lowered position and a raised position. The wheel assembly also includes a mount configured to fixedly couple to the toolbar. In addition, the wheel assembly includes a linkage assembly configured to control rotation of the wheel frame between the raised position and the lowered position. The wheel assembly also includes a fastener configured to selectively engage the mount and the linkage assembly while the wheel frame is in the lowered position to block rotation of the wheel frame.

20 Claims, 5 Drawing Sheets

(56) References Cited

U.S. PATENT DOCUMENTS

| | | | |
|---|---|---|---|
| 3,642,073 A * | 2/1972 | Geurts | A01B 59/00 172/260.5 |
| 3,705,560 A | 12/1972 | Lappin | |
| 4,011,915 A * | 3/1977 | Anderson | A01B 35/24 172/705 |
| 4,026,365 A | 5/1977 | Andersson et al. | |
| 4,364,581 A * | 12/1982 | Shoup | A01B 73/065 172/311 |
| 4,496,004 A * | 1/1985 | Frase | A01B 73/067 172/383 |
| 5,054,560 A | 10/1991 | Foley et al. | |
| 5,086,847 A * | 2/1992 | Meiners | A01B 63/22 280/43.23 |
| 5,660,237 A | 8/1997 | Boyko et al. | |
| 5,829,370 A | 11/1998 | Bender | |
| 5,975,215 A * | 11/1999 | Jensen | A01B 63/10 172/407 |
| 6,076,613 A | 6/2000 | Fraiser | |
| 6,112,827 A | 9/2000 | Reiber et al. | |
| 6,679,339 B1 * | 1/2004 | Steinlage | A01B 63/22 172/395 |
| 6,786,130 B2 * | 9/2004 | Steinlage | A01B 63/22 172/318 |
| 7,188,680 B2 * | 3/2007 | Almen | A01B 59/042 172/397 |
| 7,526,908 B1 * | 5/2009 | Rice | A01D 57/00 56/192 |
| 7,984,768 B2 * | 7/2011 | Schilling | A01B 23/06 172/566 |
| 8,235,133 B2 * | 8/2012 | Friggstad | B60B 33/0015 16/35 R |
| 8,291,997 B2 * | 10/2012 | Kovach | A01B 21/08 172/395 |
| 8,635,962 B2 * | 1/2014 | Schilling | A01C 7/203 111/163 |
| 8,727,032 B2 | 5/2014 | Friggstad | |
| 8,985,234 B2 * | 3/2015 | Gadzella | A01B 63/24 172/705 |
| 9,148,988 B2 * | 10/2015 | Baker | A01B 63/16 |
| 9,554,500 B2 * | 1/2017 | Smith | A01B 63/22 |
| 9,681,598 B2 * | 6/2017 | Anderson | A01B 63/22 |
| 9,723,788 B2 * | 8/2017 | Bucharzewski | A01D 89/004 |
| 9,883,623 B2 * | 2/2018 | Koch | A01B 63/1145 |
| 10,251,326 B2 * | 4/2019 | Andrews | A01B 61/046 |
| 10,542,656 B2 * | 1/2020 | Blunier | A01B 63/002 |
| 10,556,476 B2 * | 2/2020 | Dames | B60G 7/001 |
| 10,638,653 B2 * | 5/2020 | Anderson | A01B 63/22 |
| 11,166,402 B2 * | 11/2021 | Bauman | A01B 63/32 |
| 11,197,411 B2 * | 12/2021 | Bassett | A01C 7/203 |
| 2017/0006762 A1 | 1/2017 | Dienst et al. | |
| 2018/0092286 A1 * | 4/2018 | Anderson | A01B 63/22 |
| 2020/0053944 A1 * | 2/2020 | Sivinski | A01B 63/22 |
| 2021/0251126 A1 * | 8/2021 | Pannell | E01C 23/0825 |
| 2021/0400861 A1 * | 12/2021 | de Carvalho | A01B 63/006 |

OTHER PUBLICATIONS

McFarlane Universal Tillage Incite™ 5100 Series, Operation and Parts Manual, Version: 13882—Serial No. 21327 and up, Jul. 10, 2018, pp. 1, 17, 18, and 100, http://www.flexharrow.com/products/universal-tillage/pdf/IC5100_Operation_sn21327-higher.pdf.

* cited by examiner

WHEEL ASSEMBLY OF AN AGRICULTURAL IMPLEMENT

BACKGROUND

The present disclosure relates generally to a wheel assembly of an agricultural implement.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system may be followed by closing discs that move displaced soil back into the trench and/or a packer wheel that packs the soil on top of the deposited seeds/other agricultural products.

Planting implements typically include a toolbar configured to support the row units. In certain planting implements, the toolbar is support by multiple wheel assemblies (e.g., one wheel assembly positioned proximate to each distal end of the toolbar). Each wheel assembly may include one or more wheels and a wheel frame configured to support the wheel(s). In addition, each wheel assembly may include an actuator configured to rotate the wheel frame between a raised position and a lowered position. The wheel frame is configured to position the toolbar closer to a ground surface while the wheel frame is in the raised position, and the wheel frame is configured to position the toolbar farther from the ground surface while the wheel frame is in the lowered position. The wheel frame may be positioned in the raised position for planting operations, thereby enabling the row units to engage the soil. And, the wheel frame may be positioned in the lowered position for transportation and/or storage, thereby raising the row units above the soil/ground surface. Unfortunately, during transportation and/or storage, the toolbar may slowly lower toward the ground surface due to leakage of fluid supplied to the actuator. As a result, the row units may undesirably reengage the soil.

BRIEF DESCRIPTION

In certain embodiments, a wheel assembly of an agricultural implement includes a wheel and a wheel frame supporting the wheel. The wheel frame is configured to pivotally couple to a toolbar of the agricultural implement, the wheel frame is configured to rotate between a lowered position and a raised position, the wheel frame is configured to position the toolbar closer to a ground surface while the wheel frame is in the raised position and the wheel is in contact with the ground surface, and the wheel frame is configured to position the toolbar farther from the ground surface while the wheel frame is in the lowered position and the wheel is in contact with the ground surface. The wheel assembly also includes a mount configured to fixedly couple to the toolbar. In addition, the wheel assembly includes a linkage assembly configured to control rotation of the wheel frame between the raised position and the lowered position. The wheel assembly also includes an actuator coupled to the linkage assembly and configured to couple to the toolbar, in which the actuator is configured to drive the linkage assembly to rotate the wheel frame between the raised position and the lowered position. Furthermore, the wheel assembly includes a fastener configured to selectively engage the mount and the linkage assembly while the wheel frame is in the lowered position to block rotation of the wheel frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
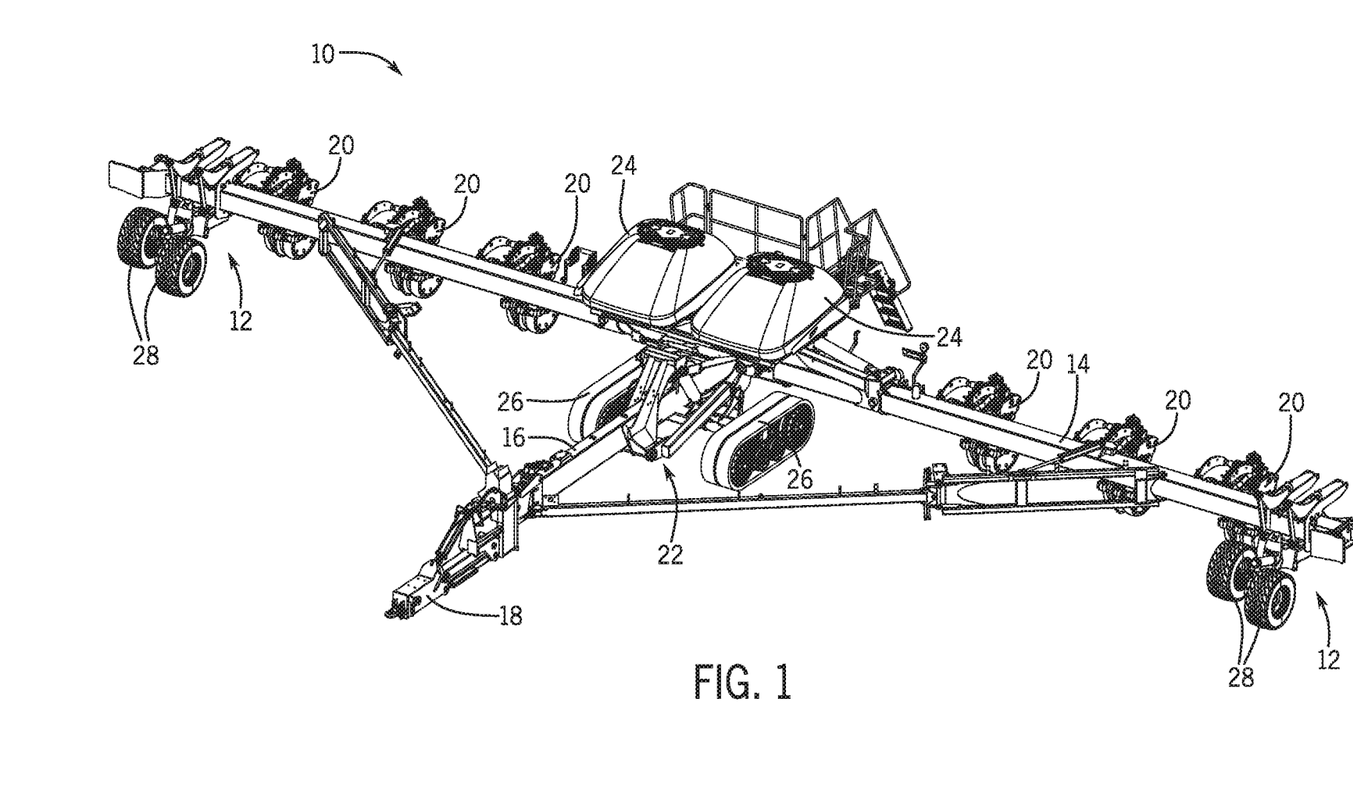
FIG. 1 is a perspective view of an embodiment of an agricultural implement having wheel assemblies configured to support a toolbar of the agricultural implement.

FIG. 1 is a perspective view of an embodiment of an agricultural implement 10 (e.g., planting implement) having wheel assemblies 12 configured to support a toolbar 14 of the agricultural implement 10. The agricultural implement 10 is configured to be towed through a field behind a work vehicle, such as a tractor. As illustrated, the agricultural implement 10 includes a main frame 16 and a hitch 18 coupled to the main frame 16. The hitch 18 is configured to couple the agricultural implement 10 to an appropriate work vehicle hitch (e.g., via a ball, clevis, or other coupling). The main frame 16 is coupled to the toolbar 14 which supports multiple row units 20. Each row unit 20 may include one or more opener discs configured to form a seed path (e.g., trench) within soil of a field. The row unit 20 may also include an agricultural product conveying system (e.g., seed tube or powered agricultural product conveyer) configured to deposit seeds and/or other agricultural product(s) (e.g., fertilizer) into the seed path/trench. In addition, the row unit 20 may include closing disc(s) and/or a packer wheel positioned behind the agricultural product conveying system. The closing disc(s) are configured to move displaced soil back into the seed path/trench, and the packer wheel is configured to pack soil on top of the deposited seeds/other agricultural product(s). While the illustrated agricultural implement 10 includes six row units 20, in other embodiments, the agricultural implement may include more or fewer row units (e.g., 10, 12, 14, 16, 18, 20, 22, 24, or more).

In the illustrated embodiment, the agricultural implement 10 includes a main support assembly 22. The main support assembly 22 is configured to support a portion of the weight of the toolbar 14, the row units 20, storage tanks 24, agricultural product stored within the storage tanks 24, and other elements of the agricultural implement 10 during planting operations, during transportation of the agricultural implement 10, and during storage of the agricultural implement 10. In the illustrated embodiment, the main support assembly 22 includes track assemblies 26 to facilitate movement of the agricultural implement 10 through the field. However, in other embodiments, the main support assembly may include wheels or a combination of wheels and track assemblies to support a portion of the weight and to facilitate movement of the agricultural implement through the field. The main support assembly 22 may include one or more actuators configured to move the toolbar 14 between a lowered position and a raised position. While the toolbar 14 is in the lowered position, the row units 20 may engage the surface of the field, thereby facilitating planting operations. In addition, while the toolbar 14 is in the raised position, the row units 20 may be disengaged from the surface of the field, thereby facilitating transportation and storage of the agricultural implement 10.

In the illustrated embodiment, the agricultural implement 10 includes a first wheel assembly 12 positioned proximate to a first distal end of the toolbar 14 and a second wheel assembly 12 positioned proximate to a second distal end of the toolbar 14, opposite the first distal end. The wheel assemblies 12 are configured to support a portion of the weight of the toolbar 14, the row units 20, the storage tanks 24, agricultural product stored within the storage tanks 24, and other elements of the agricultural implement during planting operations, during transportation of the agricultural implement 10, and during storage of the agricultural implement 10. In the illustrated embodiment, each wheel assembly 12 includes two wheels 28. However, in other embodiments, at least one wheel assembly may include more or fewer wheels (e.g., 1, 2, 3, 4, 5, 6, or more). Furthermore, in certain embodiments, at least one wheel assembly may include one or more track assemblies and/or one or more other ground engaging components (e.g., skid(s), etc.). While the illustrated agricultural implement 10 includes two wheel assemblies 12, one positioned at each distal end of the toolbar 14, in other embodiments, the agricultural implement may include more or fewer wheel assembly (e.g., 1, 2, 3, 4, 5, 6, or more) positioned at any suitable location on the agricultural implement.

In certain embodiments, each wheel assembly 12 includes a wheel frame that supports the wheel(s) 28. In such embodiments, the wheel frame is pivotally coupled to the toolbar 14, and the wheel frame is configured to rotate between a lowered position and a raised position. The wheel frame positions the toolbar closer to the surface of the field (e.g., lowered position of the toolbar) while the wheel frame is in the raised position and the wheel(s) are in contact with the surface of the field. With the toolbar 14 positioned in the lowered position/closer to the surface of the field (e.g., ground surface), the row units 20 may engage the surface of the field, thereby facilitating planting operations. In addition, the wheel frame positions the toolbar farther from the surface of the field (e.g., raised position of the toolbar) while the wheel frame is in the lowered position and the wheel(s) are in contact with the surface of the field. With the toolbar 14 in the raised position/farther from the surface of the field (e.g., ground surface), the row units 20 may be disengaged from the surface of the field, thereby facilitating transportation and storage of the agricultural implement 10. Furthermore, the wheel assembly 12 includes a mount fixedly coupled to the toolbar 14 and a linkage assembly configured to control rotation of the wheel frame between the raised position and the lowered position. The wheel assembly 12 also includes an actuator coupled to the toolbar 14 (e.g., via the mount) and to the linkage assembly. The actuator is configured to drive the linkage assembly to rotate the wheel frame between the raised position and the lowered position.

In addition, the wheel assembly 12 includes a fastener configured to selectively engage the mount and the linkage assembly while the wheel frame is in the lowered position to block rotation of the wheel frame. Because the fastener blocks rotation of the wheel frame while the wheel frame is in the lowered position, the possibility of the toolbar slowly lowering toward the surface of the field due to leakage of fluid supplied to the actuator is substantially reduced or eliminated. As a result, the row units may be maintained above the surface of the field during transport and storage.

Figure 2:
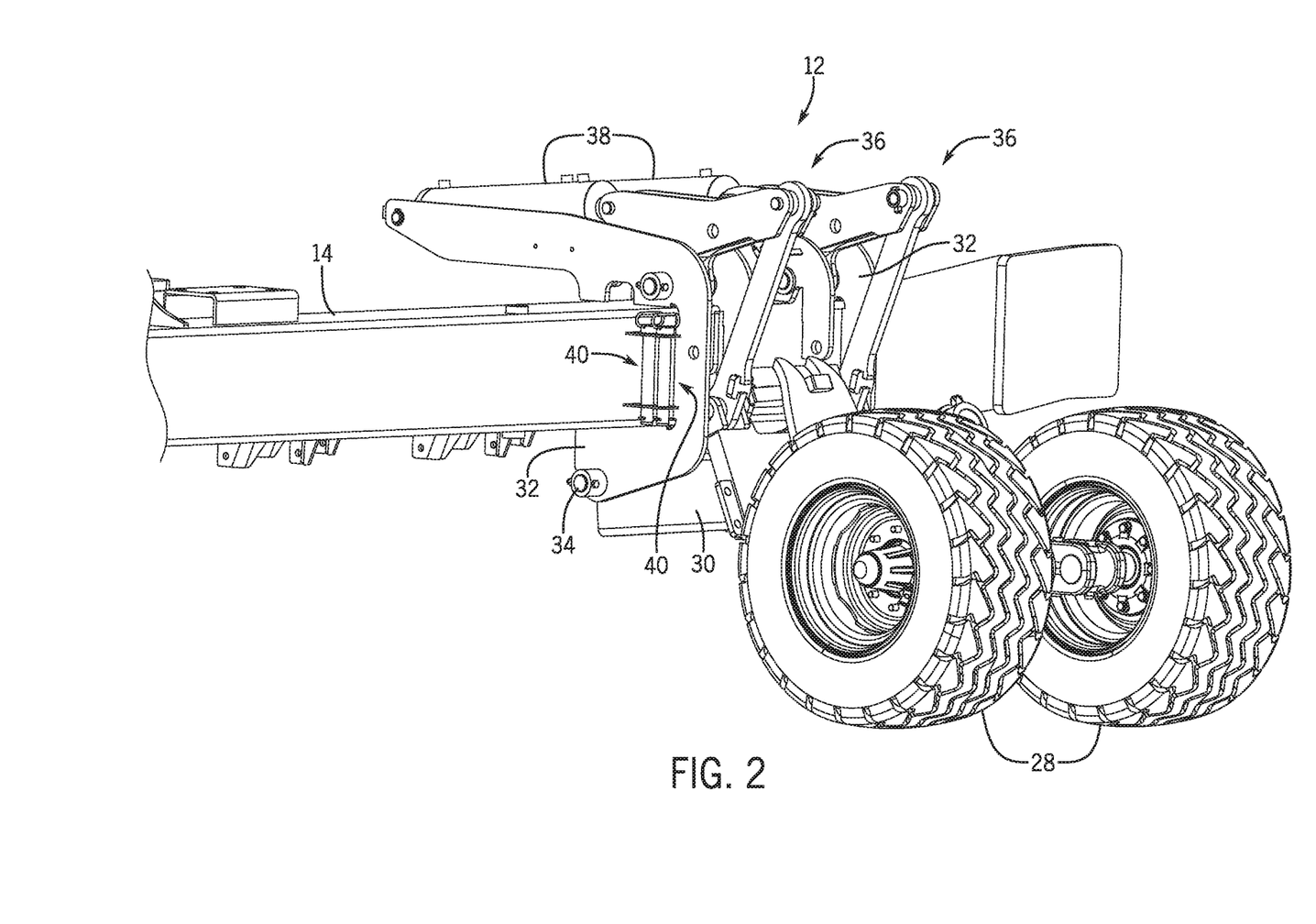
FIG. 2 is a perspective view of an embodiment of a wheel assembly that may be employed within the agricultural implement of FIG. 1, in which the wheel assembly is in a raised configuration.

FIG. 2 is a perspective view of an embodiment of a wheel assembly 12 that may be employed within the agricultural implement of FIG. 1, in which the wheel assembly 12 is in a raised configuration. As previously discussed, the wheel assembly 12 includes wheel(s) 28 and a wheel frame 30 that supports the wheel(s) 28. In the illustrated embodiment, the wheel frame 30 is pivotally coupled to the toolbar 14 via mounts 32. As illustrated, the mounts 32 are fixedly coupled to the toolbar 14, and the wheel frame 30 is pivotally coupled to the mounts 32 via pivot joints 34. While the wheel frame 30 is pivotally coupled to the toolbar 14 via the mounts 32 in the illustrated embodiment, in other embodiments, the wheel frame may be pivotally coupled to the toolbar by any other suitable arrangement (e.g., directly pivotally coupled to the toolbar, pivotally coupled to the toolbar via another suitable mounting structure, etc.).

With the wheel assembly 12 in the illustrated raised configuration, the toolbar 14 is in the lowered position, and the wheel frame 30 is in the raised position. The wheel frame 30 is configured to rotate between the illustrated raised position and a lowered position via rotation about the pivot joints 34. As previously discussed, the wheel frame 30 is configured to position the toolbar closer to the surface of the field (e.g., ground surface) while the wheel frame 30 is in the illustrated raised position and the wheel(s) 28 are in contact with the surface of the field. With the wheel frame 30 in the illustrated raised position, the row units coupled to the toolbar 14 engage the surface of the field, thereby facilitating planting operations. As discussed in detail below, the wheel frame 30 is also configured to position the toolbar 14 farther from the ground surface while the wheel frame 30 is in the lowered position and the wheel(s) 28 are in contact with the surface of the field. With the wheel frame 30 in the lowered position, the row units coupled to the toolbar 14 are positioned above the surface of the field, thereby facilitating transport and storage of the agricultural implement.

In the illustrated embodiment, the wheel assembly 12 includes linkage assemblies 36 configured to control rotation of the wheel frame 30 between the illustrated raised position and the lowered position. In addition, the wheel assembly 12 includes actuators 38 coupled to the mounts 32 and to the linkage assemblies 36. The actuators 38 are configured to drive the linkage assemblies 36 to rotate the wheel frame 30 between the illustrated raised position and the lowered position. In the illustrated embodiment, the wheel assembly 12 includes two actuators 38, each coupled to a respective linkage assembly and configured to drive the respective linkage assembly 36 to rotate the wheel frame 30. However, in other embodiments, the wheel assembly may include more or fewer actuators and/or more or fewer linkage assemblies. For example, in certain embodiments, the wheel frame may include 1, 2, 3, 4, 5, 6, or more actuators, and each actuator may be coupled to any suitable number of linkage assemblies (e.g., 1, 2, 3, 4, 5, 6, or more). Furthermore, in certain embodiments, multiple linkage assemblies may be coupled to a common actuator.

In the illustrated embodiment, the wheel assembly 12 includes fasteners 40 each configured to engage a respective mount 32 and a respective linkage assembly 36 while the wheel frame is in the lowered position to block rotation of the wheel frame 30 relative to the toolbar 14. Because the fasteners 40 block rotation of the wheel frame 30 while the wheel frame 30 is in the lowered position, the possibility of the toolbar 14 slowly lowering toward the surface of the field due to leakage of fluid supplied to the actuators 38 is substantially reduced or eliminated. As a result, the row units may be maintained above the surface of the field during transport and storage. While the illustrated wheel assembly 12 includes two fasteners 40, in other embodiments, the wheel assembly may include more or fewer fasteners (e.g., 1, 2, 3, 4, 5, 6, or more). For example, in certain embodiments, the wheel assembly may include one fastener for each linkage assembly.

Figure 3:
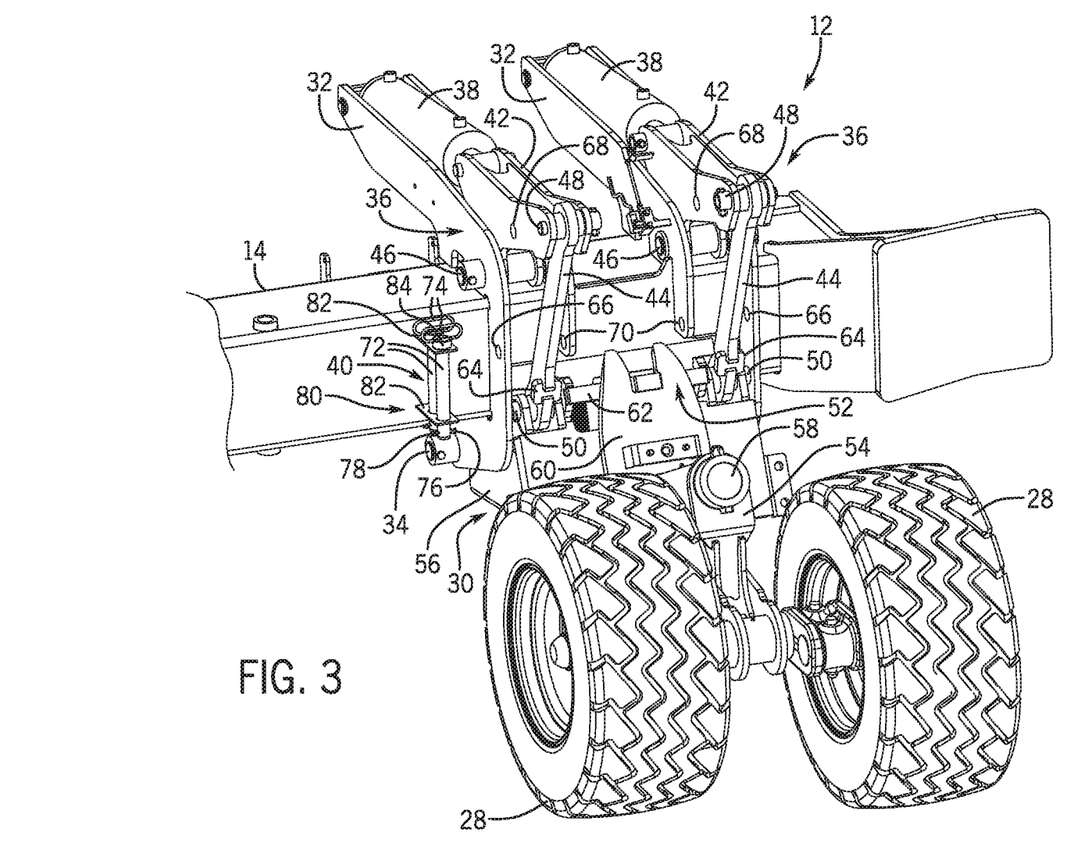
FIG. 3 is a perspective view of the wheel assembly of FIG. 2, in which the wheel assembly is in the raised configuration.

FIG. 3 is a perspective view of the wheel assembly 12 of FIG. 2, in which the wheel assembly 12 is in the raised configuration. In the illustrated embodiment, the wheel assembly 12 includes a first mount 32 and a second mount 32, and each mount 32 is fixedly coupled to the toolbar 14 (e.g., via a welded connection, via fasteners, via an adhesive connection, etc.). While the wheel assembly 12 includes two mounts 32 in the illustrated embodiment, in other embodiments, the wheel assembly may include more or fewer mounts (e.g., one mount for each actuator, etc.). As illustrated, each actuator 38 is coupled (e.g., pivotally coupled) to a respective mount 32 via a suitable connection (e.g., a pivot joint, etc.). In addition, each actuator 38 is coupled (e.g., pivotally coupled) to a respective linkage assembly 36 via a suitable connection (e.g., a pivot joint, etc.). Each actuator 38 is configured to drive the respective linkage assembly 36 to rotate the wheel frame 30 between the illustrated raised position and the lowered position. While each actuator 38 is coupled (e.g., pivotally coupled) to the toolbar 14 via a respective mount 32 in the illustrated embodiment, in other embodiments, at least one actuator may be coupled (e.g., pivotally coupled) to the toolbar directly or via another suitable structure.

In the illustrated embodiment, each linkage assembly 36 includes a first link 42 and a second link 44. The first link 42 of each linkage assembly 36 is pivotally coupled to a respective mount 32 via a pivot joint 46, thereby enabling the first link 42 to rotate relative to the respective mount 32/toolbar 14. In addition, each actuator 38 is coupled (e.g., pivotally coupled) to the first link 42 of the respective linkage assembly 36. Accordingly, each actuator 38 may drive the respective first link 42 to pivot about the respective pivot joint 46. Furthermore, the first link 42 of each linkage assembly 36 is pivotally coupled to a respective second link 44 of the linkage assembly 36 via a respective pivot joint 48, and the second link 44 of each linkage assembly 36 is pivotally coupled to the wheel frame 30 via a respective pivot joint 50. Accordingly, extension of the actuators 38 drives the first links 42 to pivot about the pivot joints 46, thereby driving the second links 44 to rotate the wheel frame 30 about the pivot joints 34 between the illustrated raised position and the lowered position. While each linkage assembly 36 includes two links in the illustrated embodiment, in other embodiments, at least one linkage assembly may include more or fewer links to control rotation of the wheel frame between the illustrated raised position and the lowered position.

In the illustrated embodiment, each actuator 38 includes a hydraulic cylinder, and a piston rod of each hydraulic cylinder is coupled to the first link of the respective linkage assembly 36. Hydraulic fluid may be supplied to the cap end of the hydraulic cylinder to drive the piston to extend, and hydraulic fluid may be supplied to the rod end of the hydraulic cylinder to drive the piston rod to retract. While each actuator 38 includes a hydraulic cylinder in the illustrated embodiment, in other embodiments, at least one actuator may include another suitable device that is driven to operate by a suitable fluid, such as a rotary hydraulic actuator, a rotary pneumatic actuator, or a linear pneumatic actuator. Furthermore, in certain embodiments, at least one actuator may include an electromechanical device configured to drive the linkage assembly to rotate the wheel frame, such as an electric motor or a linear actuator, among other suitable devices. In addition, in certain embodiments, at least one actuator may include a mechanical device configured to drive the linkage assembly to rotate the wheel frame, such as a screw drive (e.g., a manually operated screw drive, a motor actuated screw drive, etc.) or a lever assembly.

In the illustrated embodiment, the wheel assembly 12 includes a caster lock assembly 52. The caster lock assembly 52 is configured to selectively block rotation of a sub-frame 54 of the wheel frame 30 relative to a main frame 56 of the wheel frame. In the illustrated embodiment, the wheels 28 are pivotally coupled to the sub-frame 54, and the sub-frame 54 is pivotally coupled to the main frame 56 of the wheel frame 30 by a pivot joint 58. The caster lock assembly 52 is configured to block rotation of the sub-frame 54 relative to the main frame 56 while the wheel frame 30 is in the illustrated raised position. Accordingly, the rotationally locked wheels 28 may facilitate accurate movement (e.g., tracking) of the agricultural implement through the field along a direction of travel. In addition, the caster lock assembly 52 is configured to facilitate rotation of the sub-frame 54 relative to the main frame 56 while the wheel frame 30 is in the lowered position, thereby enabling the wheels 28 to caster. The castering wheels 28 may enhance turning capability of the agricultural implement (e.g., reduce the turning radius of the agricultural implement) during transport/while the row units are disengaged from the surface of the field.

In the illustrated embodiment, the caster lock assembly 52 includes a locking plate 60 fixedly coupled to the sub-frame 54, and the caster locking assembly 52 includes an engagement feature 62 pivotally coupled to the main frame 56. While the wheel frame 30 is in the illustrated raised position, a protrusion of the engagement feature 62 engages a notch in the locking plate 60, thereby blocking rotation of the sub-frame 54 about the pivot joint 58 relative to the main frame 56. As the actuators 38 drive the linkage assemblies 36 to rotate the wheel frame 30 from the illustrated raised position to the lowered position, contact elements 64, which are coupled to the second links 44, contact the engagement feature 62 and drive the engagement feature 62 to rotate such that the protrusion disengages the notch of the locking plate. As a result, while the wheel frame is in the lowered position, the wheels 28 may caster relative to the toolbar 14. While the illustrated caster lock assembly 52 includes the locking plate 60 and the engagement feature 62, in other embodiments, the caster lock assembly may include any suitable components configured to selectively block castering of the wheel (s) while the wheel frame is in the raised position. Furthermore, while the wheel assembly 12 includes a caster lock assembly 52 in the illustrated embodiment, in other embodiments, the caster lock assembly may be omitted. In certain embodiments, the wheel frame may not include a pivotable sub-frame, thereby blocking castering of the wheel(s) regardless of the position of the wheel frame.

As previously discussed, the wheel assembly 12 includes fasteners 40, and each fastener 40 is configured to selectively engage a respective mount 32 and a respective linkage assembly 36 while the wheel frame 30 is in the lowered position to block rotation of the wheel frame 30 about the pivot joints 34 relative to the toolbar 14. In the illustrated embodiment, each mount 32 has a first opening 66, and each linkage assembly 36 has a second opening 68. In the illustrated embodiment, each second opening 68 is formed in the first link 42 of the respective linkage assembly 36. However, in other embodiments, the second opening may be formed in any suitable portion of the linkage assembly (e.g., in the second link, etc.). Furthermore, in the illustrated embodiment, each mount 32 includes a third opening 70. However, in other embodiments, the third opening of at least one mount may be omitted. Each second opening 68 is positioned to align with a respective first opening 66 and a respective third opening 70 while the wheel frame 30 is in the lowered position, and each fastener 40 is configured to be disposed through a respective first opening 66, a respective second opening 68, and a respective third opening 70 to selectively engage the respective mount 32 and the respective linkage assembly 36, thereby blocking rotation of the wheel frame 30.

In the illustrated embodiment, each fastener 40 includes a pin 72 configured to engage the openings of the mounts 32 and the linkage assemblies 36. In the illustrated embodiment, each fastener 40/pin 72 includes a handle 74 configured to facilitate disposing the pin 72 through the respective openings (e.g., the first opening 66, the second opening 68, and the third opening 70). However, in other embodiments, the handle may be omitted from at least one pin. Furthermore, each pin 72 is configured to receive a locking element configured to selectively block disengagement of the pin from the respective mount 32 and the respective linkage assembly 36. In the illustrated embodiment, each pin 72 has an aperture 76 configured to receive a cotter pin 78 to selectively block removal of the pin from the respective openings (e.g., the first opening 66, the second opening 68, and the third opening 70). However, in other embodiments, the pin may be configured to receive another suitable locking element configured to selectively block disengagement/removal of the pin. For example, the pin may have a threaded distal end, and a nut may be selectively engaged with the threaded distal end to selectively block disengagement/removal of the pin from the openings. Furthermore, in certain embodiments, the locking element may be integral with the respective mount and/or the respective linkage assembly (e.g., internal threads within one or more openings). In addition, in certain embodiments, the locking element may be omitted.

In the illustrated embodiment, the wheel assembly 12 includes a storage assembly 80 coupled to the toolbar 14 and configured to store the fasteners 40 while the fasteners 40 are not engaged with the mounts 32 and the linkage assemblies 36. The storage assembly may include any suitable structure configured to secure the fasteners to the toolbar. For example, in the illustrated embodiment, the storage assembly includes two plates 82 coupled to the toolbar 14 and configured to receive the fasteners through respective openings in the plates 82. As illustrated, downward movement of the fasteners 40 is blocked by contact between a head 84 of each fastener 40 and a top plate 82, and upward movement of the fasteners 40 is blocked by contact between the cotter pin 78 and the bottom plate 82. Accordingly, the fasteners 40 may be removed from the storage assembly 80 by removing the cotter pin 78 from each pin 72 and moving each pin 72 upwardly using the respective handle 74. In addition, the fasteners 40 may be engaged with the storage assembly 80 by aligning each pin 72 with respective openings in the plates 82, moving the pin 72 downwardly until the head 84 contacts the top plate 82, and then engaging the cotter pin 78 with the pin 72. While the illustrated storage assembly 80 includes two plates 82, in other embodiments, the storage assembly may include more or fewer plates (e.g., 1, 2, 3, 4, 5, 6, or more). In addition, in certain embodiments, the storage assembly may include other and/or additional structure(s) configured to secure the fasteners to the toolbar (e.g., one or more latches, one or more magnets, one or more slots, etc.). Furthermore, in certain embodiments, the storage assembly may be omitted.

While the illustrated wheel assembly 12 includes two fasteners 40 configured to engage two respective sets of openings, in other embodiments, the wheel assembly may include more or fewer fasteners (e.g., 1, 2, 3, 4, 5, 6, or more) each configured to engage a respective set of openings. For example, in certain embodiments, for each linkage assembly, one fastener may engage a set of openings including an opening in the first link, and another fastener may engage a set of openings including an opening in the second link. Furthermore, while each fastener includes a pin in the illustrated embodiment, in other embodiments, at least one fastener may include another suitable type of fastening element, such as a bolt, a clip, a clamp, or a latch. In such embodiments, the linkage assembly and the mount may be configured to receive the fastening element. In addition, while each mount 32 supports a respective actuator 32 and respective pivot joints 34, 46 in the illustrated embodiment, in other embodiments, at least one mount may be configured to support more or fewer elements. For example, in certain embodiments, at least one mount may not support any elements, and the mount may be configured to only engage respective fastener(s) (e.g., the mount may have one or more openings configured to receive respective pin(s)). Furthermore, in certain embodiments, at least one mount may be integral with the toolbar. For example, at least one mount may include an opening in the toolbar configured to receive a respective pin.

Figure 4:
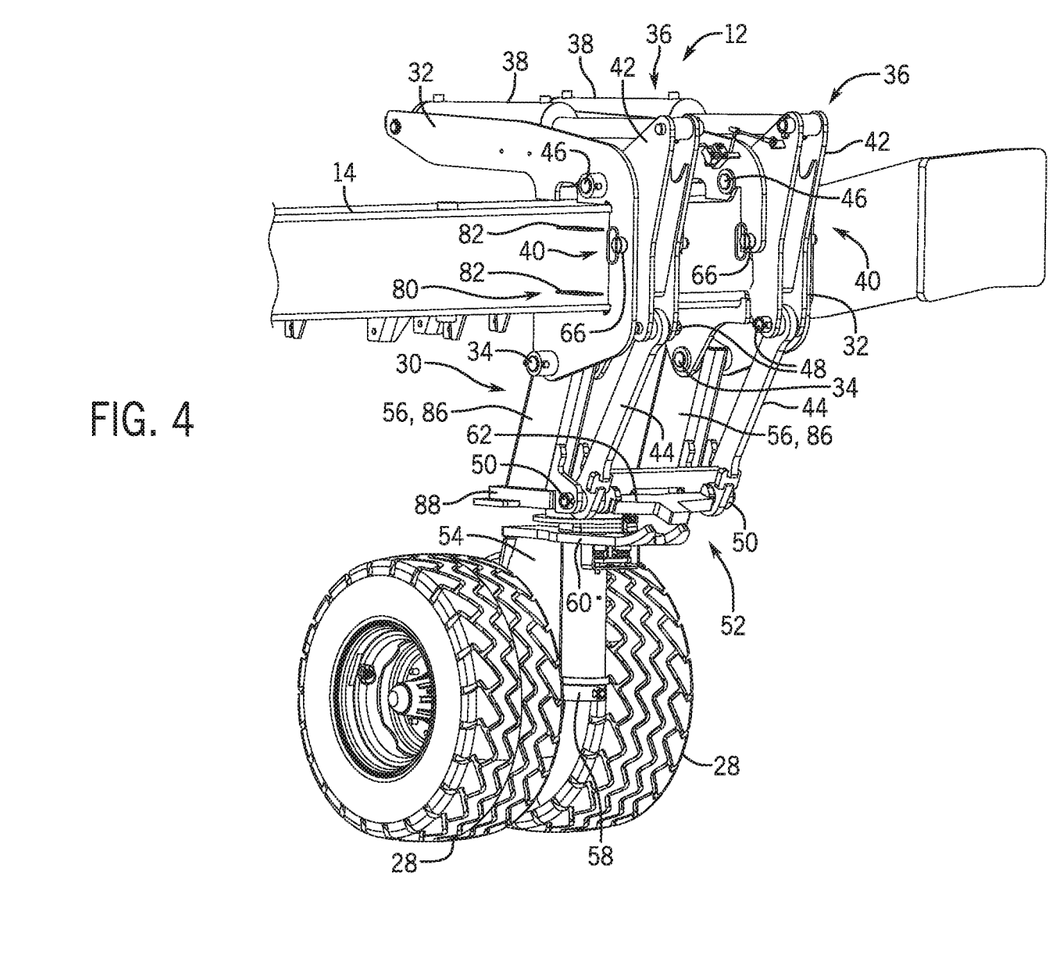
FIG. 4 is a perspective view of the wheel assembly of FIG. 2, in which the wheel assembly is in a lowered configuration.

FIG. 4 is a perspective view of the wheel assembly 12 of FIG. 2, in which the wheel assembly 12 is in a lowered configuration. As previously discussed, extension of the actuators 38 (e.g., extension of the piston rods from the hydraulic cylinders) drives the respective first links 42 to rotate about the respective pivot joints 46. As a result, the first links 42 drive the respective second links 44 to rotate the wheel frame 30 about the pivot joints 34, thereby transitioning the wheel frame 30 from the raised position to the illustrated lowered position. With the wheel frame 30 in the illustrated lowered position, the wheel assembly 12 is in the lowered configuration, and the row units coupled to the toolbar 14 are disengaged from the surface of the field, thereby facilitating transport and/or storage of the agricultural implement.

In the illustrated embodiment, the main frame 56 of the wheel frame 30 includes two rotating supports 86 and a base plate 88. Each rotating support 86 is pivotally coupled to a respective mount 32 by a respective pivot joint 34, and the base plate 88 is fixedly coupled to the rotating supports 86. In addition, the sub-frame 54 of the wheel frame 30 is pivotally coupled to the base plate 88 by the pivot joint 58. While the main frame 56 includes the two rotating supports 86 and the base plate 88 in the illustrated embodiment, in other embodiments, the main frame of the wheel frame may include any other and/or additional suitable structural components arranged in any suitable configuration.

While the wheel frame 30 is in the illustrated lowered position, the protrusion of the engagement feature 62 is disengaged with the notch in the locking plate 60, thereby facilitating rotation of the sub-frame 54 about the pivot joint 58 relative to the main frame 56 (e.g., enabling the wheel(s) 28 to caster). As the actuators 38 drive the linkage assemblies 36 to rotate the wheel frame 30 from the illustrated lowered position to the raised position, a biasing element (e.g., spring, etc.) drives the engagement feature 62 to rotate such that the protrusion engages the notch of the locking plate 60. As a result, while the wheel frame is in the raised position, the wheel(s) 28 are blocked from castering relative to the toolbar 14.

As illustrated, the fasteners 40 are removed from the storage assembly 80 and engaged with the mounts 32 and the linkage assemblies 36, thereby blocking rotation of the wheel frame 30 about the pivot joints 34 relative to the toolbar 14. With each fastener 40 engaged with the respective mount 32 and the respective linkage assembly 36, the pin extends through the openings in the respective mount 32 and the opening in the first link 42 of the respective linkage assembly 36. Contact between each pin and the respective mount 32 and contact between each pin and the respective first link 42 blocks rotation of the respective first link 42 about the respective pivot joint 46. Because rotation of the first links 42 is blocked, the second links 44 block rotation of the wheel frame 30 about the pivot joints 34 relative to the toolbar 14. Accordingly, the possibility of the toolbar 14 slowly lowering toward the surface of the field due to leakage of fluid supplied to the actuators 38 is substantially reduced or eliminated. As a result, the row units may be maintained above the surface of the field during transport and storage.

Figure 5:
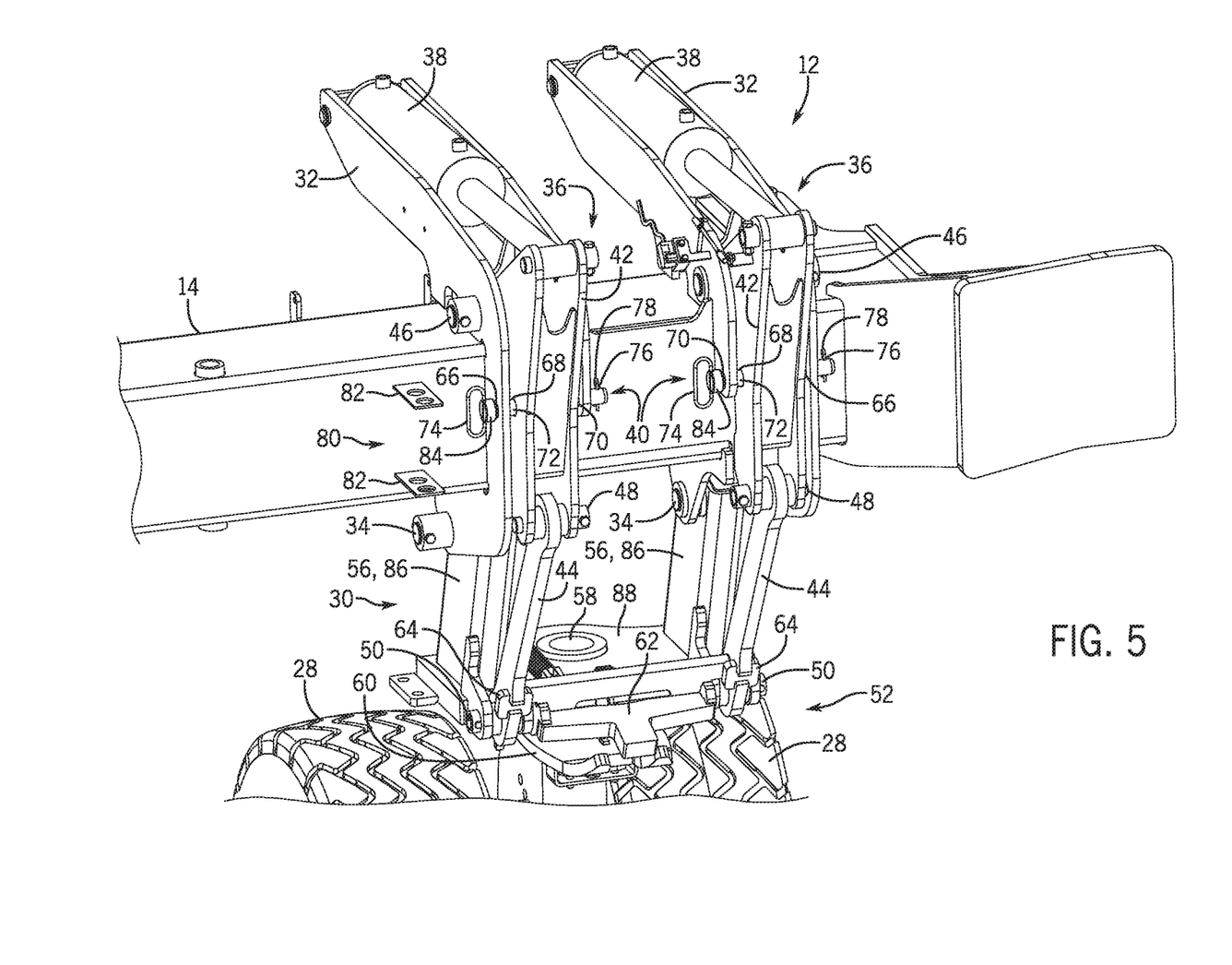
FIG. 5 is a perspective view of a portion of the wheel assembly of FIG. 2, in which the wheel assembly is in the lowered configuration.

FIG. 5 is a perspective view of a portion of the wheel assembly 12 of FIG. 2, in which the wheel assembly 12 is in the lowered configuration. The fasteners 40 are engaged with the mounts 32 and the linkage assemblies 36, thereby blocking rotation of the wheel frame 30 about the pivot joints 34 relative to the toolbar 14. As illustrated, each pin 72 extends through the first opening 66 and the third opening 70 in the respective mount 32, and each pin 72 extends through the second opening 68 in the first link 42 of the respective linkage assembly 36. As a result, contact between each pin 72 and the respective mount 32 and contact between each pin 72 and the respective first link 42 blocks movement of the respective linkage assembly 36, thereby blocking rotation of the wheel frame 30 about the pivot joints 34 relative to the toolbar 14. In addition, contact between the head 84 of each fastener 40 and the respective mount 32, and contact between each cotter pin 78 and the respective mount 32, blocks removal of each fastener 40 from the respective mount 32/linkage assembly 36.

To remove each fastener 40 from the respective mount 32/linkage assembly 36, the cotter pin 78 may be extracted from the aperture 76 of the pin 72, and the pin 72 may be extracted from the openings (e.g., using the handle 74). Each fastener 40 may then be engaged with the storage assembly 80, and the cotter pin 78 may be inserted through the aperture 76 to secure the fastener to the storage assembly 80. In addition, to install the fasteners while the wheel frame 30 is in the illustrated lowered position and the fasteners 40 are engaged with the storage assembly 80, the cotter pin 78 may be extracted from each aperture 76, and the fasteners may be removed from the storage assembly 80 (e.g., using the handles 74). With the wheel frame 30 in the illustrated lowered position, each second opening 68 may be aligned with the respective first opening 66 and the respective third opening 70. Accordingly, each pin 72 may be inserted through the respective openings (e.g., using the handle 74), and the respective cotter pin 78 may be inserted through the respective aperture 76.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wheel assembly of an agricultural implement, comprising:
   a wheel;
   a wheel frame supporting the wheel, wherein the wheel frame is configured to pivotally couple to a toolbar of the agricultural implement, the wheel frame is configured to rotate between a lowered position and a raised position, the wheel frame is configured to position the toolbar closer to a ground surface while the wheel frame is in the raised position and the wheel is in contact with the ground surface, and the wheel frame is configured to position the toolbar farther from the ground surface while the wheel frame is in the lowered position and the wheel is in contact with the ground surface;
   a mount configured to fixedly couple to the toolbar;

a linkage assembly configured to control rotation of the wheel frame between the raised position and the lowered position, wherein the linkage assembly comprises a first link pivotally coupled to the mount, the linkage assembly comprises a second link pivotally coupled to the wheel frame, and the first link is pivotally coupled to the second link;

an actuator coupled to the linkage assembly and configured to couple to the toolbar, wherein the actuator is configured to drive the linkage assembly to rotate the wheel frame between the raised position and the lowered position; and a fastener configured to selectively engage the mount and the first link of the linkage assembly while the wheel frame is in the lowered position to block rotation of the wheel frame.

2. The wheel assembly of claim 1, wherein the actuator comprises a hydraulic cylinder.

3. The wheel assembly of claim 1, wherein the mount has a first opening, the first link of the linkage assembly has a second opening, the second opening is positioned to align with the first opening while the wheel frame is in the lowered position, and the fastener is configured to be disposed through the first opening and the second opening to selectively engage the mount and the linkage assembly.

4. The wheel assembly of claim 3, wherein the fastener comprises a pin.

5. The wheel assembly of claim 4, wherein the fastener comprises a handle configured to facilitate disposing the pin through the first opening and the second opening.

6. The wheel assembly of claim 4, wherein the pin is configured to receive a locking element to selectively block removal of the pin from the first and second openings.

7. The wheel assembly of claim 1, comprising a storage assembly configured to couple to the toolbar and to store the fastener while the fastener is not engaged with the mount and the linkage assembly.

8. A wheel assembly of an agricultural implement, comprising:
a wheel;
a wheel frame supporting the wheel, wherein the wheel frame is configured to pivotally couple to a toolbar of the agricultural implement, the wheel frame is configured to rotate between a lowered position and a raised position, the wheel frame is configured to position the toolbar closer to a ground surface while the wheel frame is in the raised position and the wheel is in contact with the ground surface, and the wheel frame is configured to position the toolbar farther from the ground surface while the wheel frame is in the lowered position and the wheel is in contact with the ground surface;
a mount configured to fixedly couple to the toolbar, wherein the mount has a first opening;
a linkage assembly configured to control rotation of the wheel frame between the raised position and the lowered position, wherein the linkage assembly comprises a first link pivotally coupled to the mount, the linkage assembly comprises a second link pivotally coupled to the wheel frame, the first link is pivotally coupled to the second link, the first link has a second opening, and the second opening is positioned to align with the first opening while the wheel frame is in the lowered position;
an actuator coupled to the first link of the linkage assembly and configured to couple to the toolbar, wherein the actuator is configured to drive the linkage assembly to rotate the wheel frame between the raised position and the lowered position; and
a pin configured to be disposed through the first opening and the second opening while the wheel frame is in the lowered position to block rotation of the wheel frame.

9. The wheel assembly of claim 8, wherein the actuator comprises a hydraulic cylinder.

10. The wheel assembly of claim 8, wherein the pin comprises a handle configured to facilitate disposing the pin through the first opening and the second opening.

11. The wheel assembly of claim 8, wherein the pin is configured to receive a locking element to selectively block removal of the pin from the first and second openings.

12. The wheel assembly of claim 11, wherein the locking element comprises a cotter pin, and the pin has an aperture configured to receive the cotter pin.

13. The wheel assembly of claim 8, comprising a storage assembly configured to couple to the toolbar and to store the pin while the pin is not disposed through the first and second openings.

14. The wheel assembly of claim 8, wherein the mount has a third opening positioned on an opposite side of the linkage assembly from the first opening, and the pin is configured to be disposed through the first, second, and third openings while the wheel frame is in the lowered position to block rotation of the wheel frame.

15. A wheel assembly of an agricultural implement, comprising:
a wheel;
a wheel frame supporting the wheel, wherein the wheel frame is configured to pivotally couple to a toolbar of the agricultural implement, the wheel frame is configured to rotate between a lowered position and a raised position, the wheel frame is configured to position the toolbar closer to a ground surface while the wheel frame is in the raised position and the wheel is in contact with the ground surface, and the wheel frame is configured to position the toolbar farther from the ground surface while the wheel frame is in the lowered position and the wheel is in contact with the ground surface;
a first mount configured to fixedly couple to the toolbar;
a second mount configured to fixedly couple to the toolbar;
a first linkage assembly configured to control rotation of the wheel frame between the raised position and the lowered position;
a second linkage assembly configured to control rotation of the wheel frame between the raised position and the lowered position;
a first actuator coupled to the first linkage assembly and configured to couple to the toolbar, wherein the first actuator is configured to drive the first linkage assembly to rotate the wheel frame between the raised position and the lowered position;
a second actuator coupled to the second linkage assembly and configured to couple to the toolbar, wherein the second actuator is configured to drive the second linkage assembly to rotate the wheel frame between the raised position and the lowered position;
a first fastener configured to selectively engage the first mount and the first linkage assembly while the wheel frame is in the lowered position to block rotation of the wheel frame; and
a second fastener configured to selectively engage the second mount and the second linkage assembly while the wheel frame is in the lowered position to block rotation of the wheel frame.

16. The wheel assembly of claim 15, wherein the first actuator comprises a hydraulic cylinder, the second actuator comprises a hydraulic cylinder, or a combination thereof.

17. The wheel assembly of claim 15, wherein the first fastener comprises a first pin, and the second fastener comprises a second pin.

18. The wheel assembly of claim 15, wherein the first fastener is configured to receive a first locking element to selectively block disengagement of the first fastener from the first mount and the first linkage assembly, and the second fastener is configured to receive a second locking element to selectively block disengagement of the second fastener from the second mount and the second linkage assembly.

19. The wheel assembly of claim 15, wherein the first fastener comprises a handle configured to facilitate engaging the first fastener with the first mount and the first linkage assembly, and the second fastener comprises a handle configured to facilitate engaging the second fastener with the second mount and the second linkage assembly.

20. The wheel assembly of claim 15, comprising a storage assembly configured to couple to the toolbar, to store the first fastener while the first fastener is not engaged with the first mount and the first linkage assembly, and to store the second fastener while the second fastener is not engaged with the second mount and the second linkage assembly.

\* \* \* \* \*